United States Patent [19]

Prigent et al.

[11] Patent Number: 5,274,733
[45] Date of Patent: Dec. 28, 1993

[54] LONG-HAUL OPTICAL COMMUNICATION LINE AND METHOD OF MANUFACTURING IT

[75] Inventors: Laurence Prigent, St Germain Les Arpajon; Olivier Audouin, Savigny sur Orge, both of France

[73] Assignee: Alcatel Cable, France

[21] Appl. No.: 937,671

[22] Filed: Sep. 1, 1992

[30] Foreign Application Priority Data

Sep. 6, 1991 [FR] France .................. 91 11076

[51] Int. Cl.$^5$ .............................. G02B 6/16
[52] U.S. Cl. .................................. 385/123
[58] Field of Search ........................... 385/123

[56] References Cited

U.S. PATENT DOCUMENTS

| | | | |
|---|---|---|---|
| 4,261,639 | 4/1981 | Kogelnik et al. | 385/27 |
| 4,641,914 | 2/1987 | Sheem | 385/29 |
| 4,969,710 | 11/1990 | Tick et al. | 385/123 |

OTHER PUBLICATIONS

Publication of D. Marcuse et al., published in Journal of Lightwave Technology, vol. 9, No. 1, Jan. 1991, entitled: "Effect of Fiber Nonlinearity on Long-Distance Transmission".

Patent Abstracts of Japan, vol. 7, No. 156 (P-209)(1301) Jul. 8, 1983 & JP-A-58 066 901 (Nippon Denshin Denwa).

Patent Abstracts of Japan, vol. 6, No. 225 (P-154)(1103) Nov. 10, 1982 & JP-A-57 125 903 (Nippon Denshin Denwa).

*Primary Examiner*—Frank Gonzalez
*Attorney, Agent, or Firm*—Sughrue, Mion, Zinn, Macpeak & Seas

[57] ABSTRACT

In a long-haul optical communication line the fibers to be made into the line are grouped into pairs such that the two fibers in each pair have substantially symmetrical chromatic dispersion relative to a mean value of the chromatic dispersion of all the fibers of the line. These two fibers are thereafter connected consecutively into the line. The invention finds an application in telecommunications.

6 Claims, 3 Drawing Sheets

LONG-HAUL OPTICAL COMMUNICATION LINE AND METHOD OF MANUFACTURING IT

BACKGROUND OF THE INVENTION

1. Field of the Invention

The present invention concerns the manufacture of a long-haul optical communication line. A line of this kind may comprise 200 optical fibers each 20 km long connected in series, for example.

2. Description of the Prior Art

Commercially available fibers for this application are subject to chromatic dispersion at the wavelengths employed which distorts the signals transmitted.

If this dispersion is the only disturbing influence on the line the resulting distortion of the line output signal constitutes a primary distortion which is easily calculated, if this signal is defined, according to the length of the line fibers and their dispersion coefficients. Primary distortion of this kind can be exactly compensated by using dispersion compensating means causing chromatic dispersion opposite to that due to the line. In practise, however, dispersion is combined over the length of the line with non-linear effects such that dispersion compensating means can have only a limited efficiency, all the more so in that the chromatic dispersions of the fibers employed have a greater statistical spread. The resulting drawbacks include unacceptable transmission error rates and/or limitation of the throughput of information transmitted by the line.

Various arrangements are known in association with the use of dispersion compensating means to reduce these drawbacks.

One such arrangement is known from the document by D. Marcuse published in Journal of Lightwave Technology, vol. 9, No. 1, January 1991. This arrangement uses only fibers having a so-called "normal" dispersion which is relatively insensitive to the statistical spread of the chromatic dispersion. However, there remains some distortion due to this spread of the chromatic dispersion, mainly as the distance spanned by the link increases.

Another such arrangement retains only fibers whose chromatic dispersion is close to a given mean value. This arrangement is costly, however, because it wastes a number of fibers.

Another such arrangement classifies and connects the fibers in order of increasing chromatic dispersion as the amplitude of the optical wave conveying the signal to be transmitted decreases. This arrangement is described in the document by, D. Marcuse in Journal of Lightwave Technology, vol. 9, No. 3, March 1991.

The known arrangements are of limited effectiveness.

A particular object of the present invention is to provide in a simple and economical way a line enabling the previously mentioned drawbacks to be reduced.

SUMMARY OF THE INVENTION

In one aspect, the present invention consists in a long-haul optical communication line comprising more than one hundred optical fibers which are connected in series to form a succession of fibers having an order of succession from an origin of said line and a succession of connections associated with said fibers, any two consecutive fibers being connected by a connection, any fiber following on from a previous connection and a previous fiber and preceding a subsequent connection and a subsequent fiber, each fiber having its own inherent chromatic dispersion so that the set of fibers has a mean dispersion and the dispersions of at least a majority of said fibers have dispersion offsets relative to said mean value, said offsets having absolute values and some having a positive algebraic sign and the others a negative algebraic sign, so that each connection is associated with a cumulative dispersion offset which is the algebraic sum of the dispersion offsets of the fibers between said origin and said connection and which may itself also have one or other of said algebraic signs, in which line the order of succession of said fibers gives said cumulative dispersion offset a maximal absolute value less than 50% of the mean of the maximal absolute values that said cumulative dispersion offset would have for all possible orders of succession of the same fibers.

In another aspect the invention consists in a method of manufacturing a long-haul optical communication line comprising the following operations:

grouping together more than one hundred optical fibers having substantially the same length and to constitute subsequently said line by connection of said fibers in series, each of said fibers having its own inherent chromatic dispersion so that the set of said fibers has a mean dispersion and the dispersions of at least a majority of said fibers have dispersion offsets relative to said mean value which have absolute values and some a positive algebraic sign and the others a negative algebraic sign, and connecting said fibers in series to form a succession of fibers having an order of succession from an origin of said line and a succession of connections associated with the succession of said fibers, any two consecutive fibers being connected by a connection, any fiber following on from a previous connection and a previous fiber and preceding a subsequent connection and a subsequent fiber so that each connection is associated with a cumulative dispersion offset which is the algebraic sum of the dispersion offsets of the fibers between said origin and said connection and which can also have one or other of said two algebraic signs, in which method, at the time of connection, the order of succession applied to said fibers confers upon said cumulative dispersion offset a maximum absolute value less than 50% of the mean of the maximum absolute values that said cumulative dispersion offsets would have for all possible orders of succession of the same fibers.

In another aspect the invention consists in a method of manufacturing a long-haul optical communication line wherein:

the fibers of the line to be manufactured are grouped in pairs such that the two fibers of the same pair have chromatic dispersions substantially symmetrical to a mean value of the chromatic dispersion of the fibers of the line, and said fibers are connected in series by connecting consecutively the two fibers of each pair.

How this invention may be put into effect will now be more specifically described.

DETAILED DESCRIPTION OF THE INVENTION

Figure 1:
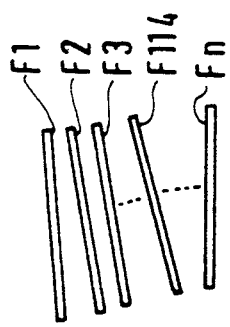
FIG. 1 is a plan view of a set of fibers forming a long-haul optical communication line in accordance with the present invention.

The method in accordance with the invention includes known operations the first of which is a grouping together of optical fibers from which said line is to be constituted subsequently by connecting the fibers in series. Each of these fibers has its own inherent chromatic dispersion so that the set of fibers has a mean dispersion and the fibers, or at least the majority of them, have dispersions differing from this mean value. The differences have absolute values and some a positive algebraic sign and others a negative algebraic sign.

A second known operation is to connect the fibers in series. This forms a succession of fibers having an order of succession from an origin of the line. It also forms a succession of connections which is associated with that of these fibers, any two consecutive fibers being connected by a connection. In the set of these two successions any fiber follows on from a previous connection and from a previous fiber and precedes a subsequent connection and a subsequent fiber. Each connection is therefore associated with a cumulative dispersion offset which is the algebraic sum of the dispersion offsets of the fibers between said origin and said connection and which can also have one or other of said two algebraic signs.

According to one feature of the invention, at the time of the connecting operation an order of succession of the fibers is used which confers upon the cumulative dispersion offset a maximal absolute value less than 50% and preferably less than 10% of the mean value of the maximum absolute values that would have been imparted to the cumulative dispersion offset for all possible orders of succession of the same fibers.

This maximal absolute value is made as small as practically possible.

To be more specific this method comprises, between said grouping and connection operations, a classification operation in which the fibers are classified into at least four separate dispersion classes each comprising fibers whose dispersion offsets have an algebraic sign of said class and absolute values between a lower limit and an upper limit of said class, each class of one algebraic sign being symmetrical to another class having the opposite algebraic sign and the same lower and upper limits. This classification operation is followed by a pairing operation in which at least 80% of said fibers are grouped into dispersion regularizing pairs, each such pair comprising two fibers in classes which are symmetrical to each other. Finally, the connection operation connects the two fibers of each pair directly together. It naturally connects the pairs together also.

There may be 50 dispersion classes each comprising four fibers, for example. However, it is obvious that, depending on the fibers available, it may be necessary to depart somewhat from the classifying and connecting rules as previously stated.

The essential is that the object of these classifications and connection rules is achieved approximately, this objective being that the cumulative chromatic dispersion increases from an origin end of the line in as regular a manner as possible.

It has been found that in the presence of nonlinear effects on the line the quality of the signal transmitted by the line was improved, possibly after partial or total terminal compensation of the cumulative dispersion, using a different type fiber having an opposite algebraic sign dispersion, and/or after filtering, using known techniques.

The present invention also consists in a line manufactured as described above.

According to FIG. 1 a set of n optical fibers F1, F2, F3, ... F114 ... Fn of same length is supplied from a fiber factory for allowing to manufacture therewith a long-haul optical communication line.

Figure 5:
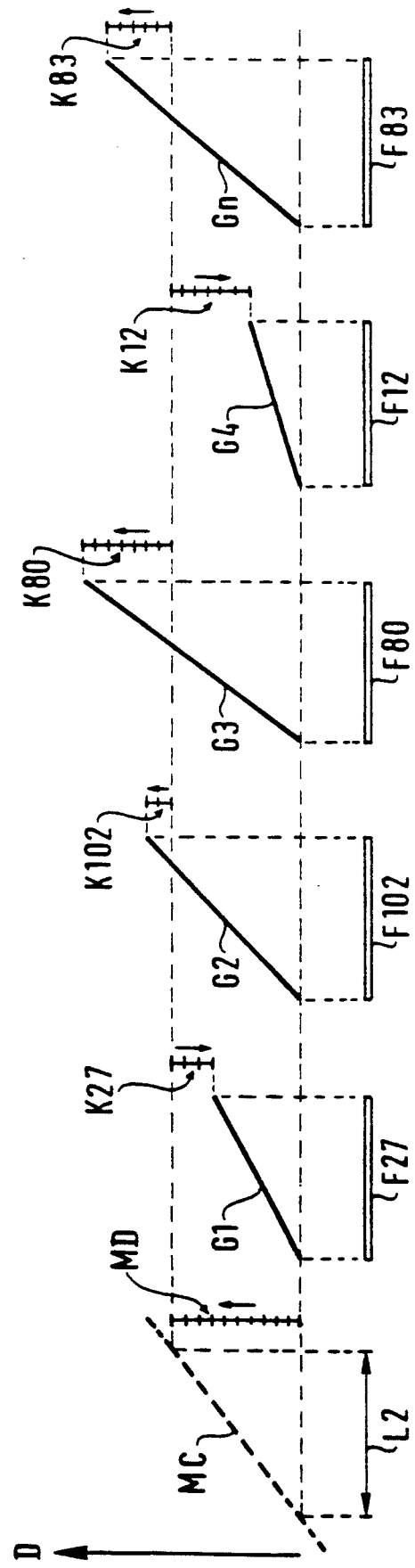
FIG. 5 is a diagrammatic representation of successive segments of the communication line plot of FIG. 4.

These fibers have respective chromatic dispersions which are generally different from each other. The present invention supply advantages in the case where a mean value of the chromatic dispersions of all the fibers of the set is different from zero because, by way of example, it would be costly to reject some of the fibers and to supply other fibers for making the mean value of the set be equal to zero. This mean value is shown on FIG. 5 as MD.

The chromatic dispersions of the fibers can have one or both algebraic signs. By way of example they are all of a same positive algebraic sign. The chromatic dispersions of fibers F27, F102, F80, F12 and F83 can be seen as the vertical components of segments G1, G2, G3, G4 and Gn. Offsets of the fiber chromatic dispersions relative to the mean value MD thereof are shown as K27, K102, K80, K12 and K83 for the five said fibers, respectively.

Figure 2:
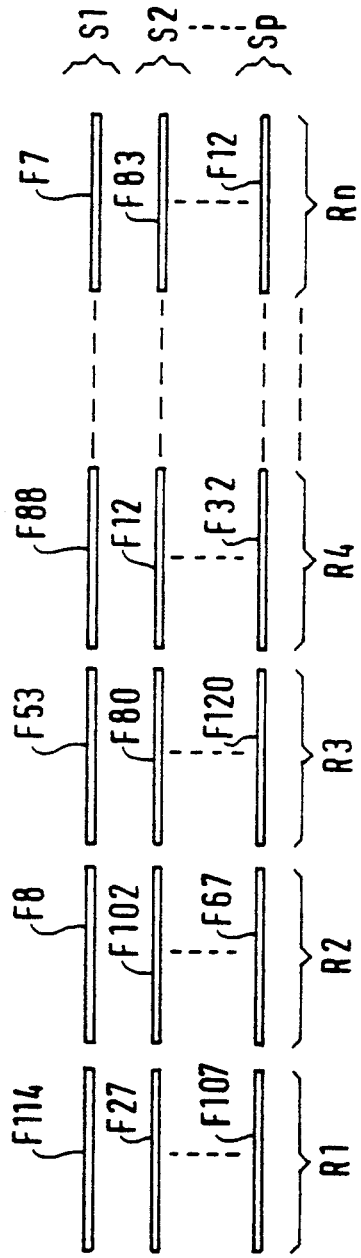
FIG. 2 is a plan view of a group of succession orders of the optical fibers of FIG. 1.

According to FIG. 2 the fibers can be ordered according to different succession orders S1, S2 ... Sp, the number p of which is n!, i.e. n factorial, as well known by any people skilled in mathematicss. The fiber ranks in these succession orders are designated R1, R2, R3, R4 ... Rn. In order to manufacture the line, one of these succession orders is chosen and will be referred to as an actual succession order S2.

Figure 3:
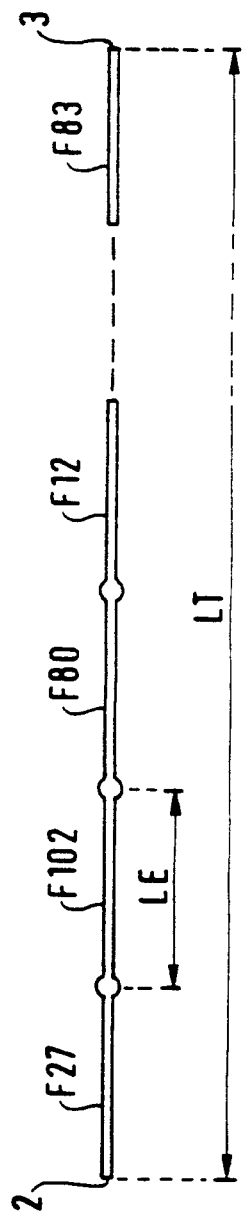
FIG. 3 is a plan view of an optical communication line forming a preferred embodiment of the claimed invention and illustrating one of the succession orders of FIG. 2 within that line.

According to FIG. 3 the fibers are connected together in series in this actual succession order from an origin 2 till an end 3 of the line. The fiber length is LE and the line and the line length is LT=nLE.

Figure 4:
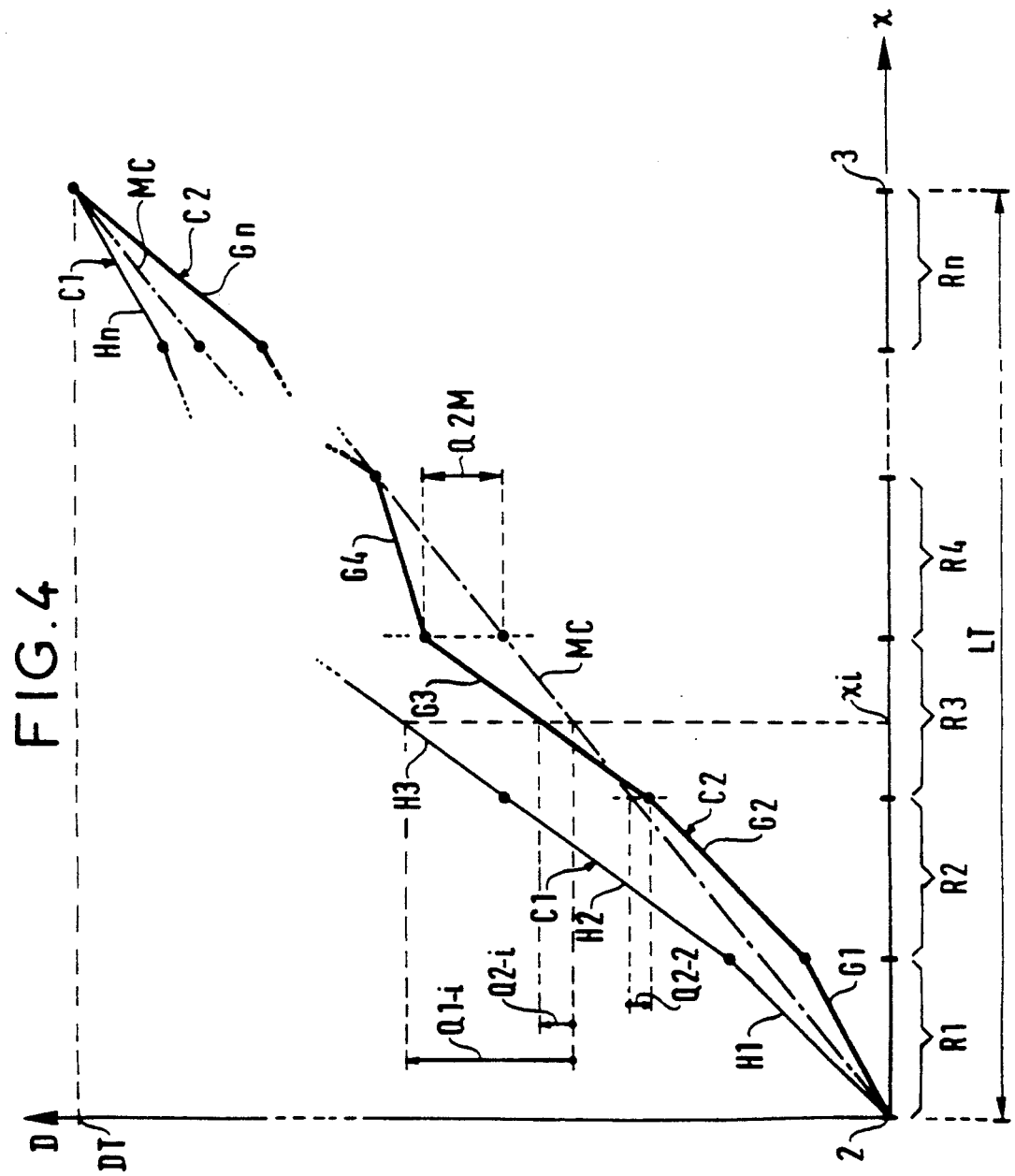
FIG. 4 is a plot of cumulative chromatic dispersions of the optical communication line of FIG. 3 and particularly a portion of that optical communication line utilizing the succession orders of FIG. 2.

On FIG. 4, the ordinates represent cumulative chromatic dispersions for three similar fiber successions one of which is the actual succession S2 of FIG. 3. At each point having an abscissa $x_6$ between zero and LT, the cumulative chromatic dispersion of a fiber succession is the algebraic sum of the chromatic dispersions of all the fibers of this succession between the origin 2 and this point.

Diagrams C1 and C2 correspond to fiber successions ordered in the succession orders S1 and S2, respectively. Diagram MC is linear and corresponds to a so called "mean fiber succession" of n fibers all having a same chromatic dispersion equal to the mean value MD of the chromatic dispersions of fibers F1 ... Fn. For every one of these three fiber successions the total chromatic dispersion is DT=n.MD.

At any abscissa such as xi and for any diagram such C1 and C2 a cumulative offset such Q1 and Q2 is a cumulative chromatic dispersion offset of the corresponding fiber succession S1 and S2 respectively, relative to the mean fiber succession. On FIG. 4 these cumulative offsets Q1-i and Q2-i are represented by the vertical distances at the abscissa xi between the linear diagram MC and the diagrams C1 and C2, respectively.

Any such cumulative offset has an absolute value, and any succession order such as S1, S2 ... Sp of FIG. 2 has an associated succession of absolute values of cumulative offsets. For any such succession order, the corresponding fiber succession presents a maximum absolute values of cumulative offsets which is associated with this succession order and which is the maximum value in the associated succession of absolute values of cumulative offsets. Such a maximum absolute value of cumulative offsets is represented at Q2M as associated with the actual succession order S2. The maximum absolute values of cumulative offsets associated with all the succession orders have a mean value. According to the present invention the actual succession order is chosen in order to make the absolute values of cumulative offsets as low as possible, i.e. to make the associated maximum absolute value of cumulative offsets as low as possible. As a result of such a choice, the maximum absolute value Q2M of cumulative offsets associated with the actual succession order S2 is low and in any case less than 50% of the mean value of the maximum absolute values of cumulative offsets associated with all the succession orders such S1, S2 ... Sp.

According to a first preferred feature of the invention the fibers F1 ... Fn are grouped into at least four separate classes each comprising the fibers whose dispersion offsets have an algebraic sign of said class and absolute values between a lower limit and an upper limit of said class. Each class of one algebraic sign is symmetrical to another class of the opposite algebraic sign having the same absolute values lower and upper limits as said each class. By way of example a first such class comprises the fibers F80 and F83 corresponding to the segments G3 and Gn. A second class is symmetrical to the first one and comprises the fiber F12 corresponding to the segment G4. A third class comprises the fiber F102 corresponding to the segment G2 and is symmetrical to a fourth class comprising the fiber F27 corresponding to the segment G1. At least 80% of the fibers F1 ... Fn form dispersion regularizing pairs each comprising two fibers such as F27 and F102 or F80 and F12 which are consecutive in the actual succession order S2 and which respectively belong to two of said classes symmetrical to each other.

According to a second preferred feature of the invention, which can be met at the same time as the first one, each previous fiber such as F102 (segment G2) of at least 80% of said fibers is followed in the actual succession order by a following fiber such as F80 the dispersion offset K80 of which is of opposite algebraic sign to a cumulative offset Q2-2 which is associated with previous fiber, i.e. which is the cumulative offset at the far end of this previous fiber, from the line origin.

There is claimed:

1. A long-haul optical communication line comprising a set of optical fibers of substantially same length having respective chromatic dispersions, said set of fibers defining a group of succession orders comprising all the succession orders in which said fibers can be ordered in succession, each said succession order giving respective ranks to all said fibers of said succession order, said set of fibers having a non zero mean chromatic dispersion, said chromatic dispersions of said fibers being different from each other so that said fibers have respective dispersion offsets relative to said mean chromatic dispersion, said dispersion offsets having respective absolute values, said set of optical fibers consisting of a first portion of fibers whose dispersion offsets have a non zero absolute value and a positive algebraic sign and a second portion of fibers whose dispersion offsets have a non zero absolute value and a negative algebraic sign, each succession order being respectively associated with a succession of cumulative offsets, in which succession of cumulative offsets, cumulative offsets are associated with and have same ranks as said fibers in said each succession order, respectively, and in which succession a first cumulative offset is the dispersion offset of a first fiber in said each succession order, a second cumulative offset is the algebraic sum of said first cumulative offset and of said dispersion offset of the fiber associated with said second cumulative offset, and wherein thereafter, each cumulative offset is the algebraic sum of a previous cumulative offset and of the dispersion offset of the fiber associated with said each cumulative offset, said cumulative offsets having respective absolute values, at least one of which is the greatest one in said succession of cumulative offsets and which constitutes a maximum absolute value of cumulative offsets respectively associated with said each succession order, said group of succession orders having a mean of maximum absolute values of cumulative offsets which is the mean of said maximum absolute values of cumulative offsets associated with all said succession order, and in which communication line, said optical fibers are connected in series according to an actual succession order from an origin of said line, with the maximum value of the cumulative offsets associated with said actual succession order being less than 50% of said mean of maximum absolute values of cumulative offsets.

2. Line according to claim 1, wherein said fibers belong to at least four separate classes each comprising the fibers whose said dispersion offsets have an algebraic sign of said class and absolute values between a lower limit and an upper limit of said class, each class of one algebraic sign being symmetrical to another class of the opposite algebraic sign having the same absolute values lower and upper limits as said each class, in which line, at least 80% of said fibers for dispersion regularizing pairs each comprising two fibers which are consecutive in an actual succession order and which respectively belong to two of said classes symmetrical to each other.

3. Line according to claim 1, wherein each fiber of at least 80% of said total fibers of the line is followed in an actual succession order by a following fiber, the dispersion offset of which is of opposite algebraic sign to said cumulative offset associated with said each fiber.

4. A method of manufacturing a long-haul optical communication line comprising the steps of:
grouping a set of optical fibers having substantially a same length, said set of fibers defining a group of succession orders comprising all the succession orders in which said fibers can be ordered in succession, each said succession order giving respective ranks to all said fibers, said fibers having respective chromatic dispersions, said set of fibers having a non zero mean chromatic dispersion, said chromatic dispersions of said fibers being different from each other so that said fibers have respective dispersion offsets which are offsets of their respective chromatic dispersions relative to said mean chromatic dispersion, said dispersion offsets having respective absolute values, a first portion of said fibers having dispersion offsets having a non zero absolute value and a positive algebraic sign, a second portion of said fibers having dispersion offsets having a non zero absolute value and a negative algebraic sign, each succession order being respectively associated with a succession of cumulative offsets in which succession of cumulative offsets, cumulative offsets are associated with and have same ranks as said fibers in said each succession order, respectively, and in which succession a first cumulative offset is the dispersion offset of a first fiber in said each succession order, a second cumulative offset is the algebraic sum of said first cumulative offset and of said dispersion offset of the fiber associated with said second cumulative offset, and thereafter each cumulative offset is the algebraic sum of a previous cumulative offset and of the dispersion offset of the fiber associated with said each cumulative offset, said cumulative offsets having respective absolute values, at least one of which is the greatest one in said succession of cumulative offsets and constitutes a maximum absolute value of cumulative offsets respectively associated with said each succession order, said group of succession orders having a means of maximum absolute values of cumulative offsets which is the mean of said maximum absolute values of the cumulative offsets associated with all said succession orders, choosing an actual succession order in said group of succession orders such that the maximum absolute value of the cumulative offsets associated with said actual succession order is less than 50% of said mean of maximum absolute values, and connecting said optical fibers in series according to said actual succession order from an origin of said line.

5. A method according to claim 4, wherein said step of choosing an actual succession order includes the steps of:

classifying said fibers into at least four separate classes, each class comprising the fibers whose said dispersion offsets have an algebraic sign of said class and absolute values between a lower limit and an upper limit of said class, each class of one algebraic sign being symmetrical to another class of the opposite algebraic sign having the same absolute values lower and upper limits as said each class, including at least 80% of said fibers into dispersion regularizing pairs each comprising two fibers which respectively belong to two of said classes symmetrical to each other, and causing said two fibers of each said dispersion regularizing pair to be consecutive in said actual succession order.

6. Method of manufacturing a long-haul optical communication line comprising the steps of:

grouping the fibers of the line to be manufactured in pairs such that two fibers of the same pair have chromatic dispersion substantially symmetrical relative to a mean value of the chromatic dispersion of the fibers of the line, and connecting said fibers in series by connecting consecutively the two fibers of each pair.

* * * * *